United States Patent
Kibler et al.

(10) Patent No.: US 8,583,721 B2
(45) Date of Patent: Nov. 12, 2013

(54) SYSTEMS AND METHODS FOR DISTRIBUTING WORK AMONG A PLURALITY OF WORKERS

(75) Inventors: Wendell Lewis Kibler, Ontario, NY (US); Yu-An Sun, Webster, NY (US); Naveen Sharma, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 645 days.

(21) Appl. No.: 12/577,910

(22) Filed: Oct. 13, 2009

(65) Prior Publication Data

US 2011/0087785 A1 Apr. 14, 2011

(51) Int. Cl.
G06F 15/16 (2006.01)

(52) U.S. Cl.
USPC ........................................................ 709/202

(58) Field of Classification Search
USPC ......................................... 709/223, 225, 226
See application file for complete search history.

(56) References Cited

U.S. PATENT DOCUMENTS

| | | | |
|---|---|---|---|
| 6,741,737 B1 * | 5/2004 | Lenoir | 382/176 |
| 2005/0015571 A1 * | 1/2005 | Kaufman et al. | 712/10 |
| 2006/0106774 A1 * | 5/2006 | Cohen et al. | 707/3 |
| 2008/0168529 A1 * | 7/2008 | Anderson et al. | 726/1 |
| 2009/0022318 A1 | 1/2009 | Kasahara et al. | |
| 2009/0083366 A1 | 3/2009 | Roantree et al. | |
| 2009/0083536 A1 | 3/2009 | Weis et al. | |
| 2009/0132822 A1 | 5/2009 | Chen | |
| 2009/0204802 A1 | 8/2009 | Araki et al. | |

* cited by examiner

*Primary Examiner* — Scott Christensen
(74) *Attorney, Agent, or Firm* — Luis M. Ortiz; Kermit D. Lopez; Ortiz & Lopez, PLLC

(57) ABSTRACT

Systems and methods for distributing work among a plurality of workers in a distributed environment using a granularity determinator module to determine a desired granularity of a data to be worked-on whereby each one of a plurality of document subcomponents individually maintains a level of security based on a security policy. The data is separated out into a plurality of subcomponents which are transmitted to respective workers. A consolidator module can be used to consolidate subcomponents worked on by the respective workers into one worked-on document or file for validation purposes. The system and methods provide an efficient and cost effective way to distribute confidential work to workers without compromising the confidentiality of the information contained in the document or file being worked on.

20 Claims, 5 Drawing Sheets

SYSTEMS AND METHODS FOR DISTRIBUTING WORK AMONG A PLURALITY OF WORKERS

BACKGROUND

The disclosed embodiments relate to methods and systems for distributing work and, more specifically but not exclusively, to methods and systems for distributing work to a plurality of workers in a distributed environment.

Documents are distributed in electronic form to multiple users or workers using a variety of technologies. For example, facsimile transmission systems can be used to transmit digital data representing a document over land from one facsimile machine to another. Computer networking systems can be used to transmit document digital data over a local or wide area network from one computerized device to another.

It is believed that the methods and systems of the illustrative embodiments provide improved methods and systems for distributing document work among a plurality of workers.

SUMMARY

The following summary of the invention is provided to facilitate an understanding of some of the technical features related to techniques, apparatus, and methods for distributing work among a plurality of workers in a distributed environment. A full appreciation of the various aspects of the invention can be gained by taking the entire specification, claims, drawings, and abstract as a whole.

The aforementioned aspects of the invention and other objectives and advantages can now be achieved as described herein.

According to one aspect of the embodiments, there is provided an automated method for distributing work among a plurality of workers in a distributed environment. A granularity determinator module receives a document or file data for a job to be worked on. The module determines the desired granularity of a plurality of subcomponents of the received document, whereby each one of the plurality of document subcomponents individually maintains a level of security based on a security policy. The received document is separated into the plurality of document subcomponents with the granularity. The document subcomponents are respectively transmitted over a computer network for reception by respective workers in a distributed environment.

By splitting the data into components that individually maintain the required level of security, work can be distributed to and performed by workers at reduced cost whilst maintaining security and confidentiality of enterprise or other data.

A consolidator module can receive from the respective workers respective document subcomponents worked on by the respective workers and combine or consolidate each one of the received worked-on document subcomponents into a worked-on document. The worked-on document can be validated, for example, by a human validator.

The document or file data can be any one of a plurality of types of media data to be worked on. For example, the file data can be text, audio and/or video data. A document can be, for example, in the form of scanned document data or can be data originally created electronically. Alternatively or additionally, the document can also be video or audio data, such as a dictation data. In one example of an embodiment, the document or file can be received at the granularity determinator module in a pre-defined document form. The granularity module determines the granularity of the plurality of document subcomponents by retrieving a corresponding document template specifying granularity of the plurality of document subcomponents. The document or file is separated out into a plurality of subcomponents with the desired granularity by applying the document template to the document data to separate the document out into the plurality of document data subcomponents.

In one example of the embodiments, a plurality of security policies can be associated with different job types, each one of the plurality of security polices defining a desired granularity whereby each one of a plurality of subcomponents of a document or file for the job type individually maintains a level of security. The type of job associated with the document or file received by the granularity module can be determined. Mapping can be performed between the job type associated with the received document and the corresponding security policy of the plurality of security policies. A mapped security policy can be used to determine the desired granularity of the plurality of subcomponents of the received document or file.

In one example of the embodiments, respective prices or budgets for working on respective document subcomponents can be determined. Workers can be paid the determined prices for working on respective document subcomponents.

According to another aspect of the embodiments, there is provided an automated system for distributing work among a plurality of workers in a distributed environment. A granularity determinator module is configured to receive a document for a job to be worked on. The module further determines a desired granularity of a plurality of subcomponents of the received document or file whereby each one of the plurality of document or file subcomponents individually maintains a level of security based on a security policy. The module separates the document or file into the plurality of document or file subcomponents with the desired granularity. The respective document subcomponents of the plurality of document or file subcomponents are transmitted over a computer network for reception by respective workers in a distributed environment.

The automated system can include a consolidator module configured to: receive over a computer network from the respective workers respective document or file subcomponents worked on by the respective workers; and combine or consolidate each one of the received worked-on document or file subcomponents into a worked-on document or file.

According to yet another aspect of the embodiments there is provided a computer program product comprising: a computer-usable data carrier storing instructions that, when executed by a computer, causes the computer to perform a method for distributing works among a plurality of workers in a distributed environment. The method can comprise: receiving a document or file for a job to be worked on; determining a desired granularity of a plurality of subcomponents of the received document or file whereby each one of the plurality of document or file subcomponents individually maintains a level of security based on a security policy; separating the received document or file into the plurality of document or file subcomponents with the granularity; and transmitting over a computer network respective document subcomponents of the plurality of document subcomponents for reception by respective workers in a distributed environment.

The method can further comprise receiving from the respective workers respective document subcomponents worked on by the respective workers and combining or consolidating each one of the received worked-on document or file subcomponents into a worked-on document or file.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

Figure 1:
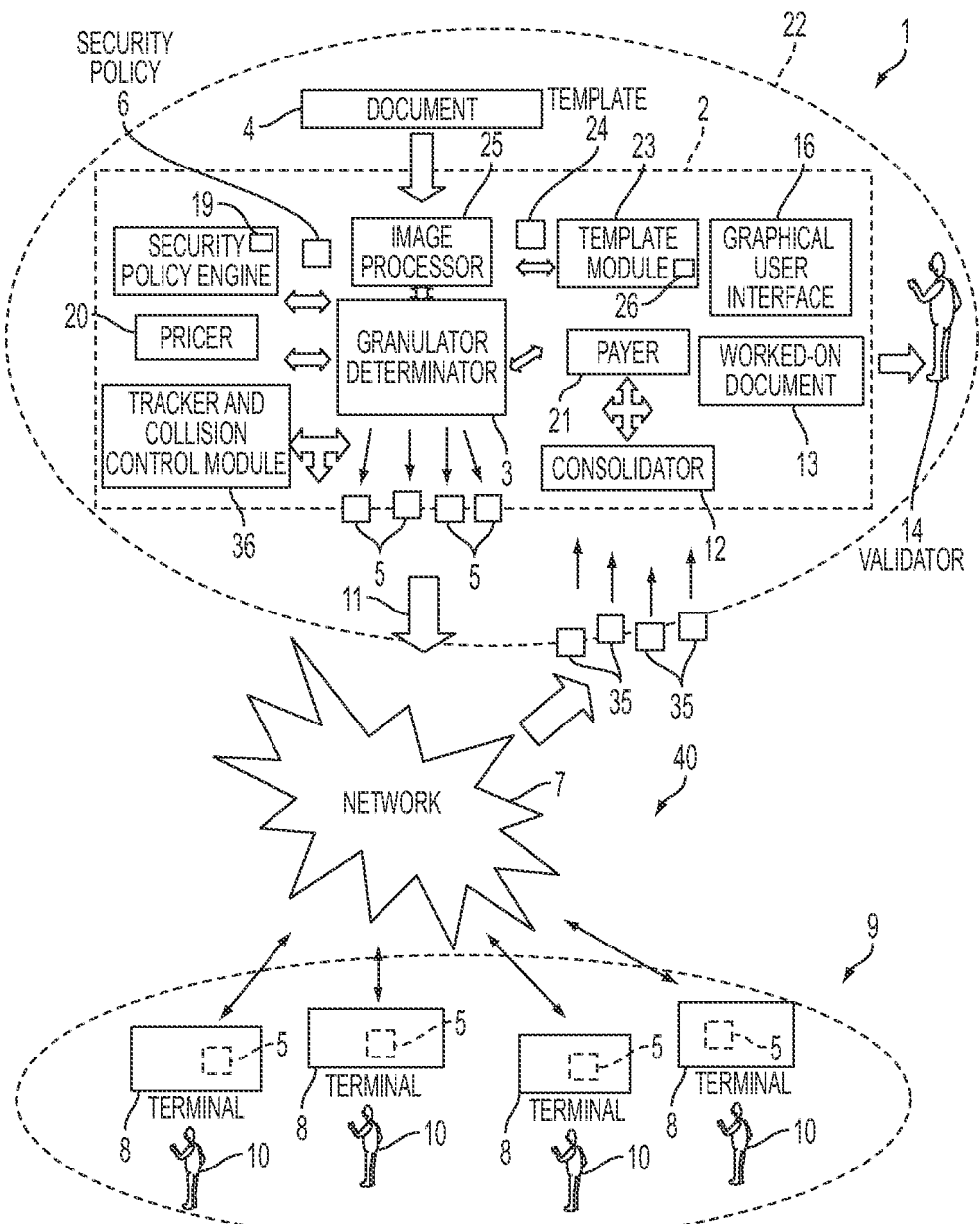
FIG. 1 illustrates a block diagram of a system for distributing work among a plurality of workers in a distributed environment according to one embodiment.

The particular values and configurations discussed in these non-limiting examples can be varied and are cited merely to illustrate at least one embodiment of the present invention and are not intended to limit the scope of the invention.

In the description hereinafter, "work" refers to any work involving document data. For example, "work" can refer to a job or task or plurality of jobs or tasks involving processing document data such as retrieving, storing, classifying, manipulating, transmitting, reporting, converting, formatting and/or translating document data. The document or file data can be any one of a plurality of types of media data to be worked on. For example, the file data can be text, audio and/or video data. A document can be, for example, in the form of scanned document data or created electronically. Alternatively or additionally, the document can also be video or audio data, such as a dictation file.

It has been determined that labor intensive jobs regarding confidential data are normally not out-sourced, but rather closely guarded within an enterprise due to security and quality assurance reasons. This causes increased costs incurred by the company and potentially slower processing of confidential data. Any enterprise may have confidential data that could be processed more efficiently by using an external labor force, but that the sensitivity of the document or file data prohibits the distribution of the data outside of the company.

Technical features described in this application can be used to construct various systems, methods, and computer program products of the illustrative embodiments that can provide a distributed labor procurement service that solves this problem, reduces costs, and potentially improves the processing speed.

The systems, methods, and computer program products of the illustrative embodiments can reduce cost, yet maintain security and confidentiality of the enterprise data by splitting the data into components that individually maintain the required level of security. The granularity of the division is based on a confidentiality policy for the data. Each task can be divided into many subtasks and parallel outsourced to distributed workers. Systems, methods, and computer program products of the illustrative embodiments can process document data for jobs or tasks in a secure manner by intelligently splitting the document data into non-sensitive components.

For each job task, there can be a security policy mapped to it. A security policy engine module can be used. It stores the mapping between the job type and the security level. The security policy can be as detailed as: each task has to be broken into subtasks that have no context information with each other, meaning if an adversary acquires task A1, it has no information about task A2. Based on the mapped security policy, the granularity determination module automatically computes how small each subtask has to be. For example, if a document is highly secret, the granularity determination module can identify the corresponding security policy and can determine that each subtask has to be no more than 2 sentences long. Once each task is broken down into subtasks, all the subtasks are then distributed in parallel to outside workers through a distributed workforce platform. The granularity module also interacts with the pricing module to determine the budget of each task and subtasks based on corporate or other budget information stored. The reward for each subtask can be calculated by the pricing module automatically based on the granularity. Once all the subtasks are complete, the consolidation module can collect all the data and recompose the whole task back to the validation process, such as an in-house human validation process, and the payment module can pay the distributed workers.

FIG. 1 illustrates a system for distributing work among a plurality of workers in a distributed environment according to one embodiment. As will be made readily apparent below, system 1 includes modules configured to perform functions for distributing the work among the plurality of workers. The functions of these modules may be implemented using individual hardware circuits, using software functioning in conjunction with a suitably programmed digital microprocessor or general purpose computer, using an application specific integrated circuit (ASIC), and/or using one or more digital signal processors (DSPs). Existing or future developed digital microprocessors, general computers, ASICs and/or DSOs may be used.

By way of example, system 1 in the illustrative embodiment of FIG. 1 has a general purpose computer or server 2 for operating the granularity determinator module 3, consolidator module 12, and other modules, as will be explained in more detail below. Computer 2 can be part of an enterprise or other business environment 22. A graphical user interface 16 enables an operator (not shown) to access and configure the respective modules, as required.

The granularity determinator module 3 is configured to receive document data 4 in electronic form for a job to be worked on and to determine a desired granularity of a plurality of subcomponents 5 of the document whereby each one of the plurality of document subcomponents individually maintains a level of security based on a security policy 6. Each document 4 may be broken into subcomponents that have no context information with each other, meaning if an adversary acquires one subcomponent 5, it has no information about another subcomponent 5. Granularity determinator module 3 is further configured to separate document 4 into the plurality of document subcomponents 5 with the determined desired granularity. Whilst FIG. 1 of the illustrative embodiment shows the plurality of subcomponents as being four subcomponents 5, there may be fewer or many more subcomponents depending on the required granularity. Granularity determinator module is operably connectable to a computer network 7 of a distributed workforce platform 40.

Distributed workforce platform 40 includes a plurality of worker terminals 8 in a distributed environment 9 each terminal being operably connectable to computer network 7. The computer network 7 can be, for example, a local area network, a wide area network, such as the internet, a telecommunication network, some other existing or future developed network, or a combination of such networks. If work is to be distributed internally rather than outsourced, computer network 7 could be a local area or other type of internal network. As indicated by arrow 11 in FIG. 1, the granulator determinator 3 is configured to transmit over the computer network 7 respective document subcomponents 5 for reception by respective workers 10 in distributed environment 9. Each worker 10 is allocated a respective document subcomponent 5.

Work terminals 8 may be any computerized or other type of automated device that is capable of being configured to receive from the granularity discriminator 3 over the network 7 subcomponent documents 5, allow workers to carry out work on the document subcomponents, and return to the granularity discriminator worked-on subcomponent documents 35. Human workers 10 manually operate the worker terminals 8 through a graphical user interface or other type of user interface (not shown). The distributed environment 9 of worker terminals is external to, remote from, and/or outside of the enterprise or other business environment 22. Alternatively, the worker terminal distributed environment 9 can be located internally within the same environment as business environment 22.

In the illustrative embodiment of FIG. 1, each worker can use an individual work terminal 8 and the granularity determinator is configured to distribute the plurality of document subcomponents 5 among the plurality of worker terminals 8, one document subcomponent to each work terminal. Each worker can, for example, be assigned an e-mail and respective subcomponents can be sent by e-mail to the respective worker's e-mail account. Alternatively, network communication and associated accounts other than e-mail can be used to send subcomponents to respective accounts for access by the respective workers. Workers use their terminals to work on their respective received document subcomponents. In the embodiment of FIG. 1, there is one worker 10 per terminal 8. However, in alternative embodiments, more than one worker may each use a same terminal 8 to access their respective subcomponents, for example, by using their e-mail or other communication accounts.

The number of distributed workers 10 is more than the number of document subcomponents 5 or subtasks to be worked on so that no single worker receives a significant piece of the document to be processed thereby potentially violating the security policy. A tracker and collision module 36 is configured to keep track of which worker 10 worked on which document subcomponent or subtask and makes sure no two document subcomponents 5 or subtasks are worked on by the same worker. To this end, the tracker and collision module 36 is configured to prevent a worker 10 receiving more than one subcomponent 5 of the plurality of subcomponents 5 by tracking which subcomponents are being sent to which workers and ensuring transmission of only one subcomponent to each worker terminal 8 or worker account. The same worker receiving more than one different subcomponent 5 is undesirable because although subcomponents individually maintain the required level of security, one subcomponent document may reveal context information about another document subcomponent resulting in a potential disclosure of confidential information to the worker. In order to prevent collision, tracker and collision module 36 can, for example, be configured to limit the time each worker 10 can spend on one document subcomponent 5 or subtask before the subcomponent is reassigned to another worker.

Whilst in the illustrative embodiment, work on each document subcomponents 5 is performed by a manual worker manually operating the worker terminal.

Consolidator module 12 is configured to receive from the worker terminals 8 the document subcomponents 5 worked on by each worker 10. In the illustrative embodiment of FIG. 1, the consolidator receives from each worker terminal one worked on document subcomponent 35 per worker 10.

Consolidator module 12 is further configured to combine or consolidate each one of the received worked on document subcomponents 35 into a combined worked on document component 13. The purpose of the consolidation module is to automatically post process all the results as much as possible before any human validation process. A validator 14 can be provided which is configured to validate a hard copy or electronic copy of the combined worked on document component 13. The validator is, or includes, a human validator.

A security policy engine module may also be included in system 1. Security policy engine includes a plurality of security policies 19 associated with different respective job types. Each one of the plurality of the security polices 19 defines a required granularity of a document for a corresponding job type whereby each one of the plurality of document subcomponents 5 individually maintains a level of security.

For example, the security policy for a legacy user manual translation job can be a list of tuples—("translation legacy user manual", "public"). Similarly, for a new user manual translation job that needs to be closely guarded before the new product release, the security policy can be ("translation new user manual before release", "top secret"). A new security policy can be added or an exiting security policy deleted through an administrative interface (not shown) of the security module.

System 1 is configured to determine the type of job associated with received document 4. Job type information can be received separately. Alternatively, job type information can be incorporated in the received document 4 itself. The security policy engine is configured to map between the job type associated with received document 4 and a corresponding security policy 6 of the plurality of security policies 19. The granularity determinator 3 is configured to receive and use the mapped security policy 6 to determine the required granularity of document 4. Based on the job type and the security requirement, the granularity module therefore determines how small a task needs to be broken down. For example, a "top secret" job for a handwritten-to-typed document conversion job can be broken down into one word per subtask. But the "top secret" job for a user manual translation job has to be at least one or two sentences due to the nature of the translation job.

System 1 may also include a pricer module 20 which is configured to determine a price or budget for each particular document subcomponent worked on. System 1 further includes a payer module 21 which is configured to pay each worker the determined price or budget for each received subcomponent worked on by the worker. The payer module 21 can be configured to send electronic payment to the bank or other financial account of the workers or to generate checks or other forms of payment for sending to the workers by alternative methods. The pricer and payer module features are useful particularly where the workers 10 work on a commission basis and/or operate independently of the business environment 22 (for example, when the document work is outsourced, as illustrated in the example of FIG. 1). However the pricer and/or payer modules 20, 21 may not be necessary in other working environments. For example, the system 1 may operate without these modules where the workers are under a contract to perform the document work on a salary rather than commission basis and are paid by independent means.

Whilst in the illustrative embodiment of FIG. 1, the granularity determinator, consolidator, pricer, payer, security policy engine, template, and other modules are implemented as separate modules in the automated controller, some or all of the modules can be combined into a single module. Furthermore, one or more of the modules can be implemented in multiple computers operably connected together by one or more local or remote networks. For example, the consolidator and, if necessary, the payer module, could be run on another computerized device at a remote location from computer 2 and configured to receive the worked on subcomponents from the worker terminals over network 7 or an alternative network.

While the granulator can generally dissect the document, such as only two sentences for distribution to any one worker, the security policy can specifically identify known secure aspects of the document such as, for example, social security number (ss#) and legal name, which will be processed in one way. In addition to the security module, if there is an additional granularity requirement, a user can submit a template to specify it. For example, if the document contains "social security number" and "legal name" forms, they should not be in the same document subcomponent or subtask. Different document forms will require a prior knowledge of what data can and cannot be processed together. For this reason, system template module 23 is configured to allow a system-knowledgeable person to create a template 24 that will instruct the granularity module 3 how to divide the document into appropriate pieces. Template module 23 can include a plurality of user defined templates 26, one for use with each predefined document form type. This plurality of templates can be stored in or associated with the template module in an appropriate searchable storage area such as a repository or database. Each template contains instructions or information specifying how to separate the document data out into a plurality of document data subcomponents with the required granularity. If a template is to be used to additionally define the required granularity, document 4 received by system 1 is in a particular one of a plurality of pre-defined form types. An image processing module 25 is configured to image process the received document data to identify the particular pre-defined form type from the document.

Figure 2:
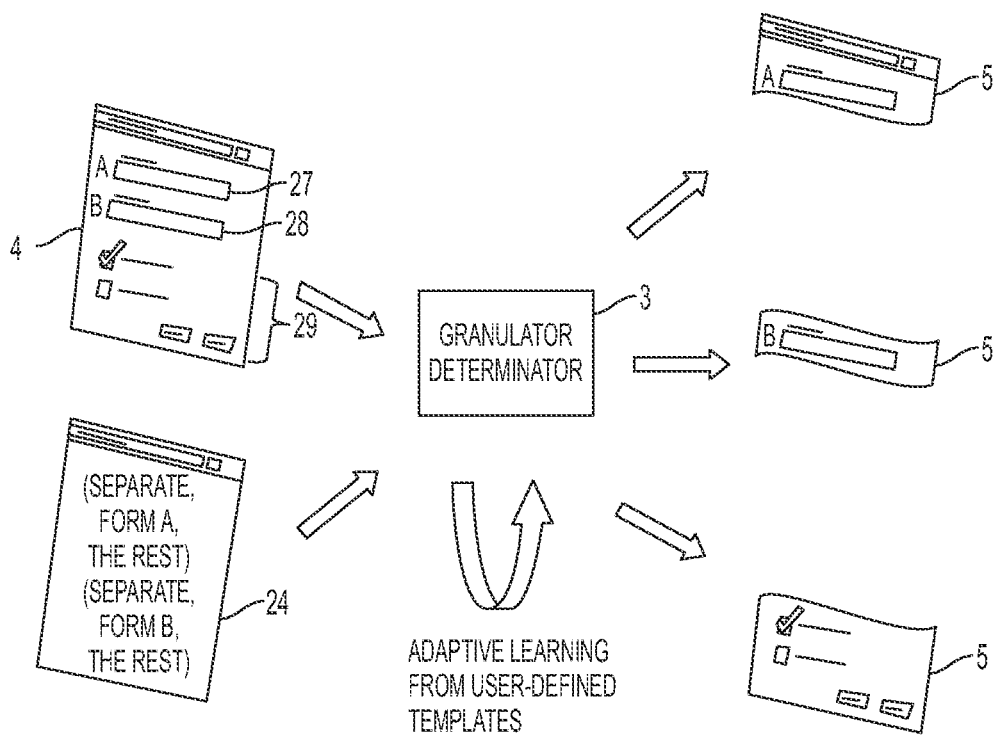
FIG. 2 illustrates a user defined template being applied to a document in a pre-defined form to separate the document out into a plurality of subcomponents according to one embodiment.

FIG. 2 illustrates an exemplary template being applied to a received document 4 in a predefined form type to separate the document out into separate subcomponents, according to one embodiment. As shown in FIG. 2, the document data is arranged in the pre-defined form having a first page section 27 (A), a second page section 28 (B) below the first page section, and a third page section 29 containing the remainder of the page data below the second page section. The corresponding template 24 contains instructions to filter or separate document 4 out into the first page section A as first subcomponent 5, the second page section B as a second subcomponent 5, and the third page section as a third subcomponent 5. The granularity determinator can also be configured to adaptively learn from the pre-defined templates.

Figure 3:
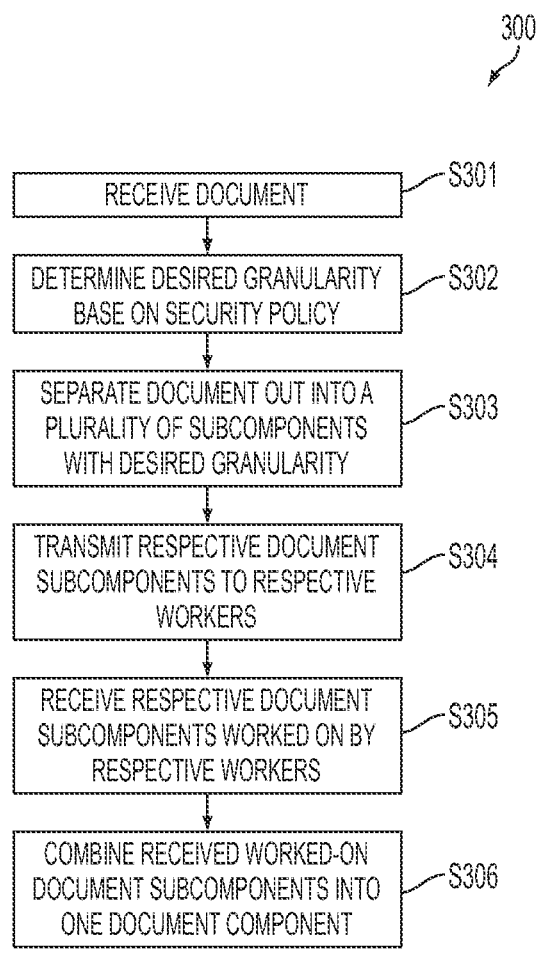
FIG. 3 illustrates a flow chart outlining a method of distributing work to a plurality of workers in a distributed environment according to one embodiment.

Methods for securely distributing work according to various embodiments will now be described. FIG. 3 illustrates a flow chart outlining a method 300 for distributing work among a plurality of workers in a distributed environment, according to one embodiment. A document in electronic form for a job to be worked on is received (S301). A determination is made of a desired granularity of a plurality of subcomponents of the document whereby each one of the plurality of document subcomponents individually maintains a level of security based on a security policy (S302). The received document is separated into a plurality of document subcomponents with the determined desired granularity (S303). Respective document subcomponents are transmitted over a computer network (S304) for reception by respective workers in a distributed environment. Respective document subcomponents worked on by respective workers are received over the network from the respective workers (S305). The received worked-on document subcomponents are combined or consolidated into one worked on document component (S306). Method 300 can be implemented in the system of FIG. 1, alternative embodiments thereof, or in other systems.

A job to be worked on can involve processing data contained in the document. For example, the job to be worked on can be a handwritten-to-typed document conversion or a manual translation of documents. Consider by way of example that a global enterprise needs to translate confidential internal documents to different languages. Automatic translation through computer programs is not yet a mature technology and has not replaced human translators. There are several solutions for carrying out manual translation work of confidential documents in secure manner. A pool of in-house translators can be maintained, a $3^{rd}$ party translator agency can be retained, or a lengthy in-house training process can be implemented to train in-house workers. Workers may also be required to sign NDA documents. None of these solutions is particularly efficient or cost-saving.

A method 400 for distributing work for a job among a plurality of workers in a distributed environment according to one embodiment will now be described in detail will reference to the flow charts of FIGS. 4 and 5. Method 400 can, for example, be implemented in the system of FIG. 1 or alternative embodiments of system 1. Reference will also be made to method 400 using an example in which the received document 4 to be worked on is a user manual translation job.

Figure 4:
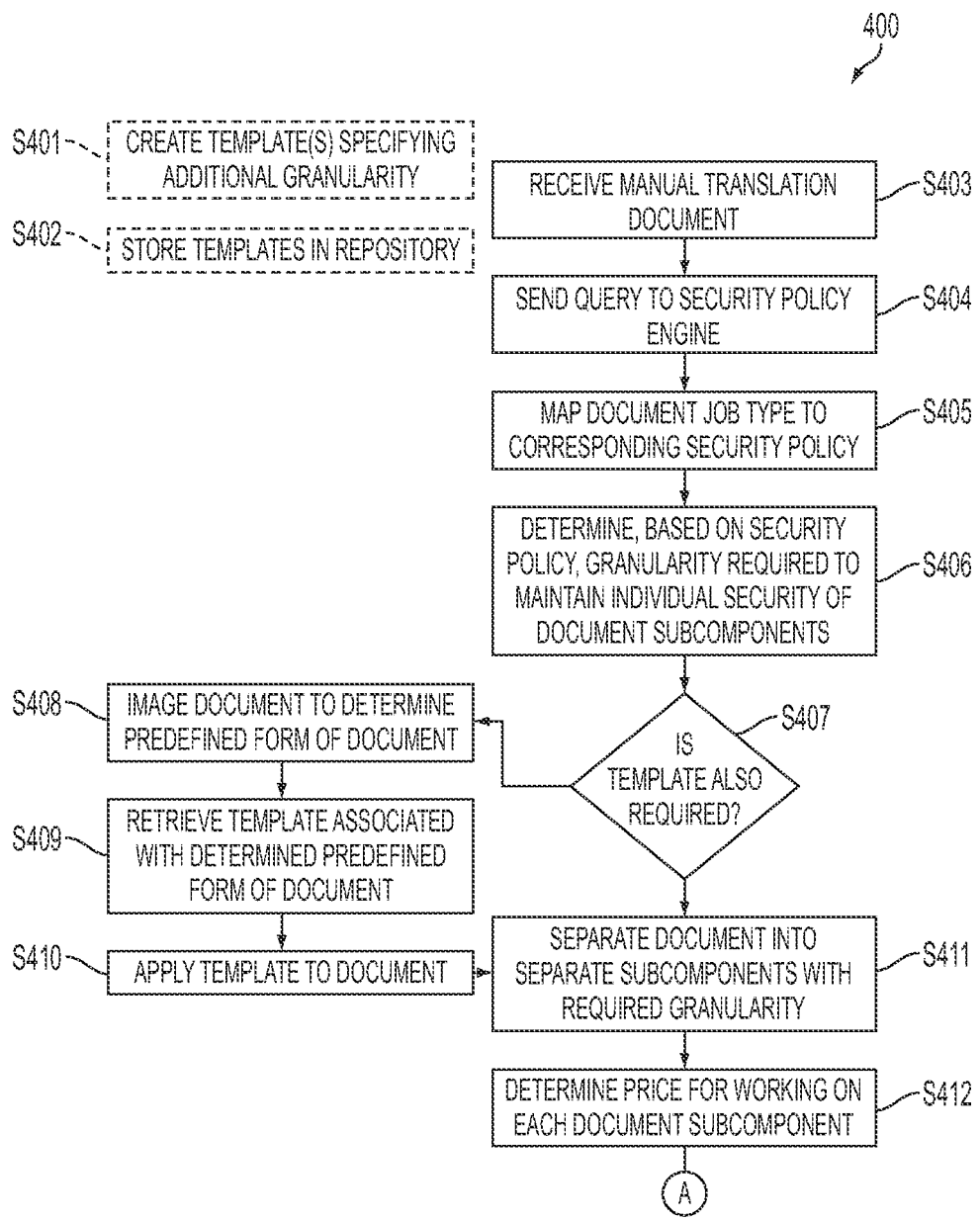
FIGS. 4 and 5 illustrate a flow chart outlining a method of distributing work to a plurality of workers in a distributed environment according to another embodiment.
Figure 5:
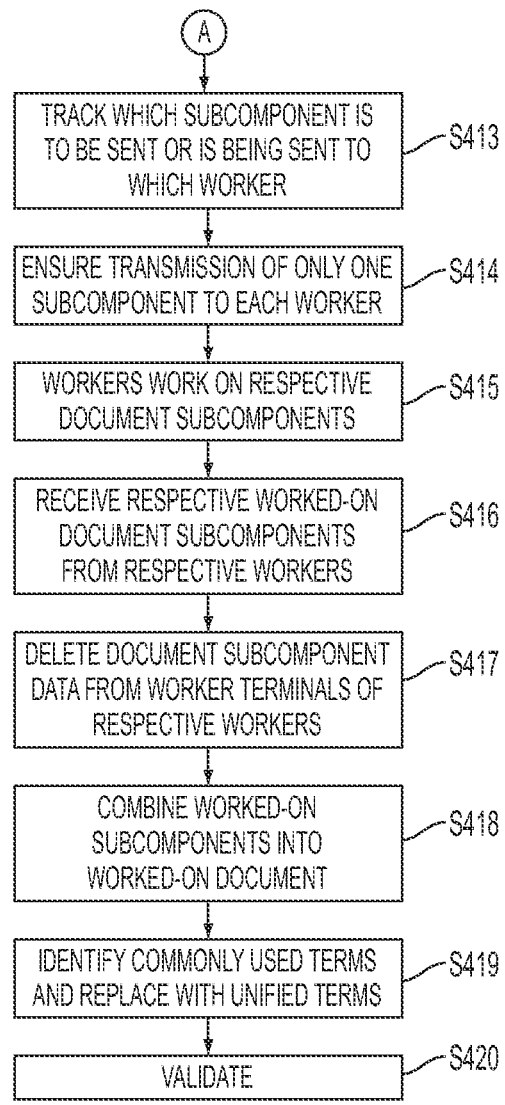

Referring to FIG. 4, if one or more templates specifying additional granularity are to be used in determining granularity, a user first creates the templates using the graphical user interface 16 (S401). These user defined templates are then stored in the template module repository (S402). Document 4 to be worked on is received by system 1 (S403). Document 4 to be worked on can already be in an electronic form. Alternatively, hard copy documents, such as paper documents, can be scanned by a suitable digital scanner (not shown) and then document 4 is provided to the system as scanned document data. The granularity determination module 3 sends a query to the security module when it receives a document 4 to be outsourced and worked-on (S404). Security policy engine maps the document job type to a corresponding security policy (S405). In the example of a manual translation job, security policy engine maps the manual translation job type to a corresponding security policy (S405). For example, the security policy engine maps a "top secret" user manual translation job to a "top secret" user manual translation security policy. Based on the security policy requirement, the granulator determinator 3 then determines the desired granularity (S406). The granularity module determines how small the document or task needs to be broken down. For example, for the "top secret" job, the user manual translation job has to be at least one or two sentences due to the nature of the translation job.

If a template is also required to specify additional granularity requirements (S407), a pre-defined form of the document 4 to be worked on is automatically determined via image processing (S408). The user defined template 24 associated with the determined document pre-defined form is retrieved from the repository of the template module 23 (S409) and then applied to document 4 (S410). For example, if the document 4 to be translated is of the form type shown in FIG. 2, template 24 is applied to document 4 so that sections 27, 28, 29 of the document 4 are separated out into respective subcomponents 5 with the desired granularity.

Pricer module 20 determines the price for working on each document subcomponent 5 (S412). Tracker and collision module 36 tracks which one of the plurality of subcomponents 5 is to be sent or is being sent to which worker 10 (S413). Based on this tracking, only one respective subcomponent 5 is transmitted to each worker (S414). The module does this to make sure no two subcomponents 5 are accessed or worked-on by the same worker. In this manner, system 1 effectively parallel outsourcers the document work to distributed workers whilst preventing the confidential information contained in the document from being disclosed to the individual workers. Workers 10 receive the respective subcomponents at their worker terminals 8 and work-on the respective document subcomponents 5 (S415). For the translation example, the translators (workers) work on the respective subcomponents by translating them into the required language(s). Workers then respectively return the worked-on subcomponents over the network 7. For the translation example, the worked-on subcomponents are the translations of the subcomponents.

The consolidator module 12 respectively receives worked-on subcomponents 35 from worker terminals 8 (S416). Tracker and collision module deletes subcomponent data (original and worked-on) from user terminal 8 of each worker. This may be performed in response to the worker's respective worked-on subcomponent 5 being received by the system or after a pre-defined time limit (S417). To avoid collision, the tracker and collision module effectively limits the time each worker can spend on working on one subcomponent. Any contract with the worker to be paid for the work is revoked after a certain amount of time and the subcomponent to be worked on is reassigned to another worker. The consolidator module 12 combines the received document subcomponents 35 into one combined worked-on document (S418).

The consolidator module combines all document subcomponents received from the worker devices back to one large file so that the human validation process does not require processing a large number of files. For the translation example, the combined worked-on document is a combined translated document which is effectively a manual translation of document 4. The consolidator module unifies the terminology in the combined file (S419). In the case of the translation example, the consolidation module can identify most commonly used translated terms and replace all the mapped words with the unified terms. For example, if a frequency of a word translated into "automobiles" is 80% and that into "cars" is 20%, the consolidation module will replace all the "cars" with "automobiles". S420 is an optional process. Then, the combined worked-on document is validated by a human validator.

Method 300 can allow a global enterprise or other business to outsource such translation work in an efficient and cost effective manner without compromising the confidential information contained in the work.

Method 400 can alternatively be performed without using templates to separate document 4 out into subcomponents in which case S401, S402 and S407 to S410 are redundant.

It will be appreciated that several of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

The claims, as originally presented and as possibly amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. An automated method for distributing work among a plurality of workers in a distributed environment, the method comprising;

receiving at a granularity determinator module document or file data for a job to be worked on;

determining a desired granularity of a plurality of subcomponents of said received data, wherein said desired granularity is more granular when said received data requires more security and less granular when said received data requires less security, and wherein said desired granularity is further determined according to a job type of said job to be worked on, and whereby each one of said plurality of data subcomponents individually maintains a level of security based on a security policy;

separating said received data into said plurality of data subcomponents with said granularity; and transmitting over a computer network respective data subcomponents of said plurality of data subcomponents for reception by respective workers in a distributed environment.

2. The automated method of claim 1, further comprising receiving at a consolidator module from worker terminals of said respective workers respective data subcomponents worked on by said respective workers; and combining or consolidating each one of said received worked-on data subcomponents into a worked-on document or file.

3. The method of claim 2, further comprising validating said worked-on document or file has been correctly combined or consolidated from said received worked-on data subcomponents.

4. The method of claim 1, wherein receiving said document data comprises:

receiving said document data in a pre-defined document form wherein said pre-defined document form comprises a plurality of pre-defined page sections;

wherein determining the granularity of said plurality of data subcomponents includes retrieving a document template corresponding to said pre-defined document form, specifying granularity of said plurality of data subcomponents from a repository of a template module; and wherein separating said document data into said plurality of subcomponents with said granularity comprises applying said document data template to said document data to separate said document data out into said plurality of document data subcomponents.

5. The method of claim 1, further comprising:

providing a plurality of security policies associated with different job types, each one of said plurality of security polices defining a desired granularity whereby each one of a plurality of subcomponents of data for the job type individually maintains a level of security;

determining the type of job associated with said received docu lent or file data;

mapping between the job type associated with the received document or file data and the corresponding security policy of the plurality of security policies; and using said mapped security policy to determine said desired granularity of said plurality of subcomponents of said received data.

6. The method of claim 1, further comprising receiving over said network at worker terminals respective subcomponents of said plurality of data subcomponents to be worked on and using said worker terminals to work on said respective subcomponents.

7. The method of claim 1, further comprising determining respective prices or budgets for working on respective data subcomponents.

8. The method of claim 7, further comprising paying workers the determined prices for working on respective data subcomponents.

9. The method of claim 1, further comprising;
tracking which subcomponent of said plurality of subcomponents is to be sent or is being sent to which worker of said plurality of workers;
limiting an amount of time which each of said workers is allowed to work on said subcomponents and providing said subcomponent to a different worker if said worker fails to finish work on said subcomponent in said amount of time; and
controlling transmitting over said computer network respective data subcomponents to ensure only one data subcomponent is transmitted to each worker based on said tracking.

10. An automated system for distributing work among a plurality of workers in a distributed environment, the system comprising;
a granularity determinator module embodied as non-transitory instruction media residing in a computer configured to:
receive document or file data for a job to be worked on;
determine a desired granularity of a plurality of subcomponents of said received data, wherein said desired granularity is more granular when said received data requires more security and less granular when said received data requires less security, and wherein said desired granularity is further determined according to a job type of said job to be worked on, and whereby each one of said plurality of data subcomponents individually maintains a level of security based on a security policy;
separate said data into said plurality of data subcomponents with said granularity; and
a distributed workforce platform embodied as a plurality of computers operably connected to said granularity determinator module, said distributed workforce platform being configured to transmit over a computer network respective data subcomponents of said plurality of data subcomponents for reception by respective workers in a distributed environment.

11. The automated system of claim 10, further comprising a consolidator module embodied as non-transitory instruction media residing in a computer configured to:
receive over a computer network from said respective workers respective data subcomponents worked on by said respective workers; and
combine or consolidate each one of said received worked-on data subcomponents into a worked-on document or file.

12. The automated system of claim 10, wherein said document data comprises a pre-defined document form, further comprising:

an image processor module embodied as non-transitory instruction media residing in a computer configured to image and determine the pre-defined form of the received document data;
a plurality of templates, each one of said plurality of templates being associated with a particular pre-defined document form and specifying a desired granularity of said plurality of document data subcomponents;
wherein said granularity determinator module is configured to:
additionally determine the desired granularity of said plurality of document subcomponents by retrieving for said determined pre-defined form of said imaged document a corresponding document template specifying granularity of said plurality of document data subcomponents; and
separate said document data into said plurality of subcomponents with said granularity by applying said document template to said document data to separate said document out into said plurality of document data subcomponents.

13. The automated system of claim 10, further comprising:
a plurality of security policies associated with different job types, each one of said plurality of security polices defining a desired granularity whereby each one of a plurality of subcomponents of data for the job type individually maintains a level of security;
a security engine module embodied as non-transitory instruction media residing in a computer configured to:
determine the type of job associated with said received document or file data;
map between the job type associated with the received data and the corresponding security policy of the plurality of security policies; and
wherein said granularity determinator module is configured to use said mapped security policy to determine said desired granularity of said plurality of subcomponents of said received data.

14. The automated system of claim 10, further comprising a pricer module embodied as non-transitory instruction media residing in a computer configured to determine respective prices or budgets for working on respective data subcomponents and further comprising a payer module configured to pay workers the respective prices or budgets for working on the respective data subcomponent.

15. The system of claim 10, further comprising;
a tracker and collision avoidance module embodied as non-transitory instruction media residing in a computer configured to:
track which subcomponent of said plurality of subcomponents is to be sent or is being sent to which worker of said plurality of workers;
limit an amount of time which each of said workers is allowed to work on said subcomponents and provide said subcomponent to a different worker if said worker fails to finish work on said subcomponent in said amount of time; and
control transmission over said computer network of respective data subcomponents to ensure transmission of only one subcomponent to each worker based on said tracking.

16. The system of claim 11, wherein said received document data for a job comprises a confidential manual translation job document, wherein said worked-on subcomponents of said manual translation job document comprise translated subcomponents and wherein said worked-on document comprises a translated document.

17. A computer program product comprising:

a computer-usable non-transitory instruction media storing instructions that, when executed by a computer, causes the computer to perform a method for distributing work among a plurality of workers in a distributed environment, the method comprising:

receiving document or file data for a job to be worked on;

determining a desired granularity of a plurality of subcomponents of said received data, wherein said desired granularity is more granular when said received data requires more security and less granular when said received data requires less security, and wherein said desired granularity is further determined according to a job type of said job to be worked on, and whereby each one of said plurality of subcomponents individually maintains a level of security based on a security policy;

separating said received data into said plurality of data subcomponents with said granularity; and transmitting over a computer network respective data subcomponents of said plurality of data subcomponents for reception by respective workers in a distributed environment.

18. The computer program product of claim 17, the method further comprising receiving from said respective workers respective data subcomponents worked on by said respective workers; and combining or consolidating each one of said received worked-on data subcomponents into a worked-on document.

19. The computer program product of claim 17, wherein receiving said document data comprises receiving said document in a pre-defined document form wherein said pre-defined document form comprises a plurality of pre-defined page sections;

wherein determining the granularity of said plurality of data subcomponents includes retrieving a document template corresponding to said pre-defined document form, specifying granularity of said plurality of data subcomponents from a repository of a template module; and wherein separating said received data into said plurality of subcomponents with said granularity comprises applying said document template to said document data to separate said document out into said plurality of document data subcomponents.

20. The computer program product of claim 17, the method further comprising:

determining the type of job associated with said received document or file data;

mapping between the job type associated with the received document or file data and a corresponding security policy of a plurality of security policies, said plurality of security policies being associated with different job types, each one of said plurality of security polices defining a desired granularity whereby each one of a plurality of subcomponents of data for the job type individually maintains a level of security; and using said mapped security policy to determine said desired granularity of said plurality of subcomponents of said received data.

* * * * *